Aug. 23, 1932.  E. E. KLEINSCHMIDT  1,873,206
SELECTIVE SYSTEM AND APPARATUS
Original Filed April 16, 1928  3 Sheets-Sheet 1

INVENTOR.
Edward E. Kleinschmidt
BY
William A. Straud
ATTORNEY.

Aug. 23, 1932.  E. E. KLEINSCHMIDT  1,873,206
SELECTIVE SYSTEM AND APPARATUS
Original Filed April 16, 1928   3 Sheets-Sheet 3

FIG. 10

INVENTOR
EDWARD E. KLEINSCHMIDT
BY *H.B. Whitfield*
ATTORNEY

Patented Aug. 23, 1932

1,873,206

UNITED STATES PATENT OFFICE

EDWARD E. KLEINSCHMIDT, OF CHICAGO, ILLINOIS, ASSIGNOR TO TELETYPE CORPO-
RATION, OF CHICAGO, ILLINOIS, A CORPORATION OF DELAWARE

SELECTIVE SYSTEM AND APPARATUS

Application filed April 16, 1928, Serial No. 270,388. Renewed October 19, 1931.

This invention relates to systems and apparatus for selectively controlling various operations from distant points, for example control of remotely disposed motors, switching apparatus and mechanical operations. It is particularly useful in the transmission of intelligence and in the preferred embodiment herein disclosed, the invention is illustrated in the application to a printing telegraph system.

In selective systems of the kind referred to, where a plurality of distant operations must be controlled, transmitting and receiving apparatus are essential. Where the number of operations to be performed is greater than the number of channels for transmission of energy, as for example, where only one line wire is used in a printing telegraph system such as shown, a definitely timed relation of operation must be established between the transmitters and receivers. It will, however, be understood by those skilled in the art, that the invention is not limited to use with a single line wire. A plurality of line wires may be used with the invention in its broader aspects, or the invention may obviously be adapted to signalling over single Morse channels of a multiplex system, or over a single carrier telegraph channel and it is applicable to the usual wireless or radio signalling systems.

Systems maintaining a substantially synchronous relation between distant apparatus are well known in the art. A particular class of such systems rely on operating the apparatus in definite cycles to maintain the necessary timed relation. Each cycle of operation comprises a starting of the apparatus at the beginning of the cycle, the performance of a series of operations, and the stopping of the apparatus at the end of the cycle. In the telegraph art, such systems have become known as "start-stop" systems. The present invention is described and shown in its application to a system and apparatus of the start-stop type.

In the start-stop systems of the prior art, it has been the practice to operate the transmitting and receiving apparatus at slightly different speeds. This has been found necessary due to the impossibility of avoiding slight variations in driving speed, and in order to enable proper correction to be made. Two general types of driving means have been used; the usual motor drive timed to run at definite speeds in various manner and stepping devices interrupting local direct current circuits. The Cardwell start-stop system and the "grasshopper" distributor systems are examples of the latter type. The usual motor drive systems are cumbersome, expensive and difficult to regulate while ordinary stepping systems vary with changes in potential condition of contacts and numerous other conditions and are therefore impractical. It is obvious that when the speed of transmitter and receiver change more than a relatively slight degree the operativeness of the system is completely destroyed until the speeds are readjusted with respect to the transmitter and receiver at distant stations. This readjustment presents serious difficulties and results in annoyance and loss of time.

As described in application Serial No. 608,341 of which this application is a continuation in part, these difficulties are overcome by utilizing closely regulated alternating currents for driving the printer sets. As an illustration commercial sources of alternating current are disclosed for driving the transmitters and receivers in definite timed relation with respect to the frequencies of said sources. In communities that are large enough to require telegraph service, sources of alternating current for lighting and power purposes are available and inasmuch as it is customary in power practice to regulate the potentials and frequencies of these sources very closely, a simplified and highly accurate synchronizing arrangement is thus obtained. Where, however, systems are located in buildings such as hotels, alternating curent power is often not avilable. Particularly is this often the case where stock ticker systems are located.

In these systems it is particularly desirable to operate a number of stock tickers by alternating current in order to eliminate the necessity of providing a direct current motor with individual speed control governors and their accompanying complications. It is accordingly proposed to generate such a frequency at a central transmitting station, these currents flowing over a separate line independently of the signalling currents for driving the motors at each of the remote receiving stations.

Supplying driving impulses from the transmitting station permits complete control of all the stock tickers from the transmitting station inasmuch as the driving power may be turned on or off as desired. Driving all the printers by alternating currents from a single central source will maintain all of the printers at the correct speed without requiring a frequent check up of motor governors as would be necessary if each printer had its individual control drive.

Accordingly, an object of my invention is to provide a system in which cumbersome and expensive motors are eliminated and in which variations of speeds, potentials, contacts and other local conditions are minimized.

Another object of the invention is the provision of a simple system in which the transmitter and receiver are driven at substantially equal speeds and no attention need be given to speed regulation.

A further object of the present invention is to provide simple, reliable and cheap apparatus for generating a common alternating current source to operate a number of printers within a short radius in synchronism.

Other objects of the invention are such as will be attained by the utilization of the principles and apparatus herein disclosed and hereinafter set forth and as defined by the terms of the appended claims.

Figures 1, 2, 3, 4, 5, 6, 7:
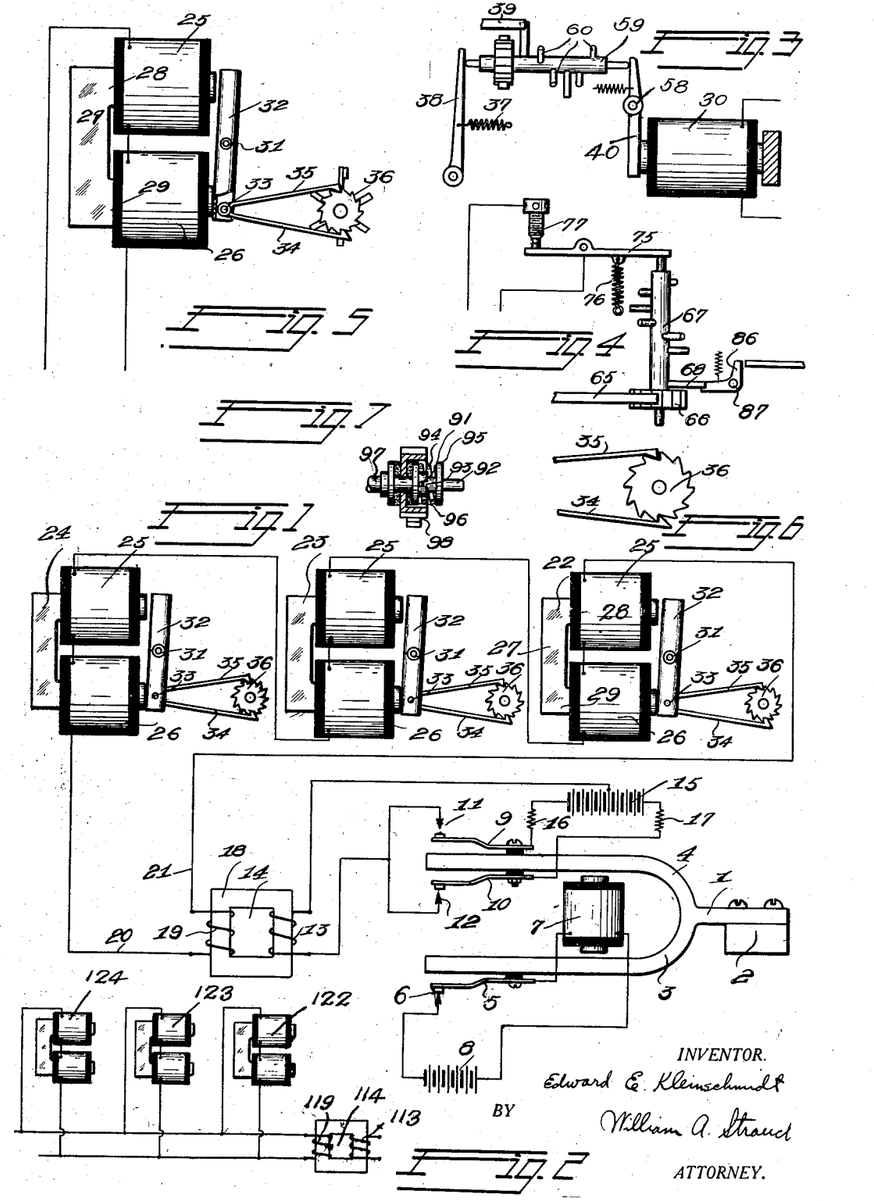
Figure 1 is a diagrammatic view of the apparatus and circuits employed in a preferred embodiment of my invention.
Figure 2 is a diagrammatic showing of a modification of circuits and apparatus employed in carrying out my invention.
Figure 3 is a plan view showing the essential element of a preferred embodiment of the receiver.
Figure 4 is a plan view showing the essential element of a transmitter employed in carrying out my invention.
Figure 5 is a front elevation showing the driving means for the pin barrel shaft.
Figure 6 is a front elevation showing the relative positions of the pawls and the ratchet.
Figure 7 is a front elevation partly in section showing a modified form of the pin barrel selector stopping mechanism.

In Figure 1, transmitting fork 1 secured to fixed support 2 is provided with tines 3 and 4 upon which are secured weights (not shown) for the purpose of regulating the vibration rate of the tines. Secured to the tine 3 is an insulated contact operating member 5 which as the tine 3 spreads and comes together alternately engages and disengages fixed contact 6. Connected in series with these contacts is a magnetic drive magnet 7 and a battery 8. To start the fork into vibration, the tines are spread by hand and released. The movement of the tines outward closes a circuit through the magnet 7 which then attracts the tines 3 and 4 and draws them inward. As the tines move inward, contacts 5 and 6 separate and magnet 7 is deenergized. In this manner the fork is kept in powerful vibration at a uniform and predetermined rate.

Secured to the end of tine 4 are insulated contact operating members 9 and 10. Member 9 alternately engages and disengages with the stationary contact 11 as the tines vibrate and contact 10 engages and disengages the stationary contact 12 as the tines move outward. Contacts 9 and 11 and contacts 10 and 12 alternately close a circuit including the primary winding 13 of a transformer 14, a battery 15 and resistances 16 and 17. The transformer 14 comprises in addition to the primary winding 13 the usual type of magnetic core 18, and a secondary winding 19 connected in a line circuit 20 and 21. Connected in series with the line circuit 21 are a series of alternating current line relays 22, 23 and 24 located at various remote points each of which may control either a transmitter or receiver of the type fully described in the patent to Kleinschmidt #1,567,392 issued December 29, 1925.

From the above description, the operation will be clear. As the tines 3 and 4 spread, contacts 9 and 11 engage and current flows in a predetermined direction from the battery 15 through the primary winding 13, contacts 9 and 11 in engagement and through resistance 16 back to battery 15. The resultant change in rate of current flow in winding 13 will generate a magneto motive force producing a change in the rate of flow of flux in the laminated core 18 of the transformer 14. The change in rate of flux cutting the conductors of the secondary 19 generates an electro motive force therein, and as a result current flows in the conductors 20 and 21. When the contacts 9 and 11 disengage, the decreasing rate of current flow in the primary winding 13 and the resultant drop in the magneto motive force will cause a decrease in the rate of flux cutting the secondary winding 19 and a voltage will accordingly be generated producing currents flowing in the reverse direction. This is repeated when contacts 10 and 12 engage completing a circuit through the primary winding 13 and battery 15. As a result, therefore, of the vibrations of fork 1, an alternating current flows in the conductors 20, 21, the frequency of which is determined by the rate at which contacts 12 and 10 and 9 and 11 engage and disengage. Inasmuch as the rate of vibrations of the fork can be varied, any desired frequency can be obtained. The alternating current flowing through the polar relays 22, 23 and 24 will operate their receivers in a manner now to be described in connection with relay 22 which is similar in construction and operation to the other relays.

Polar relay 22 comprises coils 25 and 26 mounted on a permanent horseshoe magnet (not shown) to one leg of which is secured a U-shaped laminated soft iron core 27. Coils 25 and 26 are wound about the legs 28 and 29 of the core 27. Pivoted at 31 to the other leg of the permanent magnet is a soft iron armature 32. When the circuit of the coils 25 and 26 is open a magnetic field is set up by the permanent magnet through the core 27 and armature 32 tends to remain in the position shown in Figure 1. Legs 28 and 29 are cut at angles and are so positioned relative to the armature 32 as to insure sticking of the armature 32 in either of its biased positions during a normal nonoperating period. When the circuit of the magnet coils 25 and 26 is closed, reversals of current supplied to the coils alternately strengthen and weaken the normal magnetic field in legs 28 and 29, thereby effecting the oscillation of armature 32 about its pivot 31 in unison with the reversal of current supplied by the alternating current source.

Pivotally mounted on armature 32 at 33 is a double acting pawl member comprising arms 34 and 35. As the lower end of armature 32 is rocked about its pivot 31 in a clockwise direction as shown in Figure 1, the lower arm 34 of the pawl member pulls on a tooth of driving ratchet wheel 36 and the upper arm 35 of the pawl member is moved from engagement with one tooth and rides over the next tooth in the ratchet wheel 36. Similarly, as a result of the movement of armature 32 about its pivot 31 in a counter clockwise direction, upper arm 35 of the pawl member pushes on the tooth it had previously ridden over and the lower arm 34 of the pawl member moves away from the tooth it pulled and rides over the next tooth. It will be apparent that in this manner the ratchet wheel 36 is rotated in definite timed relation with respect to the reversals of alternating current. The relation of the ratchet wheel speed of rotation to frequency may of course vary, as it depends upon the movement of pawl 34 over the teeth and the number and size of teeth on wheel 36. These are varied to adapt the transmitter or receiver to the particular local conditions, the source of alternating current, and speed requirements. It will therefore be obvious that two stations on the same system may not necessarily have the same frequency. It will be clear that relays 22—24 may be connected in a normally open circuit which, upon receipt of the first code signal, is closed to permit operation of these relays.

In Figure 2 substantially the same arrangement is disclosed as shown in Figure 1. A tuning fork arrangement similar to that disclosed in Figure 1 is connected in series with the primary winding 113 of the transformer 114 and as a result alternating currents flow in the secondary winding 119. In this system, however, the magnets 122 to 124 are all connected across the line instead of in series as in Figure 1. This permits of a lower operating voltage although the current flow must be correspondingly greater.

In Figure 3 a diagrammatic showing of a receiver which may be employed in the system disclosed in Figure 1 is shown in which a magnet 30 responsive to code combination of impulses rocks its armature 40 about 58 to move pin barrel 59 longitudinally. A series of cams 60 angularly and longitudinally spaced about pin barrel 59 successively cooperate with selectors as described in detail in the patent to Kleinschmidt #1,567,599 issued December 29, 1925. The pin barrel is rotated by a magnet such as 22 (Figure 1) operating through a pawl cooperating with the teeth of a ratchet wheel 36. A spring 37 operating through pivoted lever 38 moves pin barrel 59 longitudinally and disengages the stop pin from stop 39 to permit rotation of the shaft.

Figure 8:
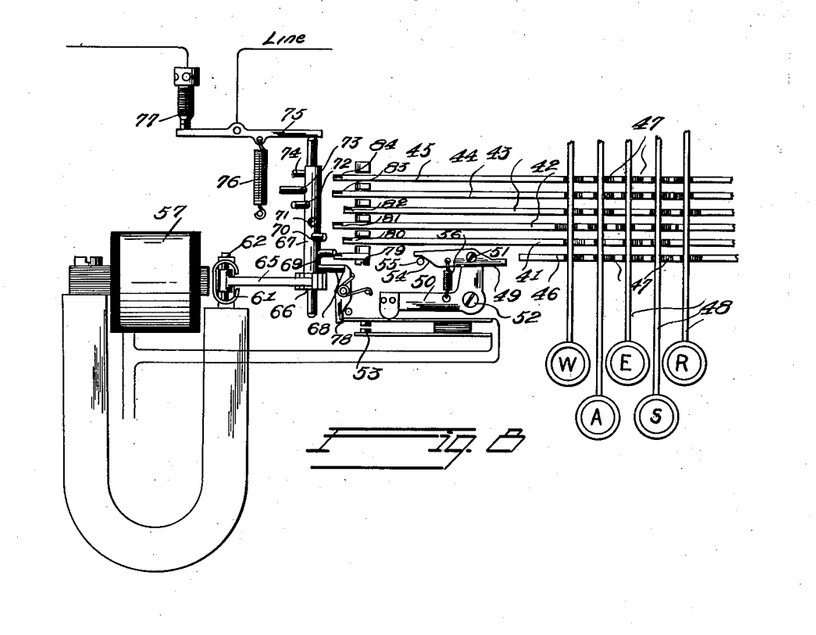
Figure 8 is a plan view showing the essential elements of the transmitter.
Figure 9:
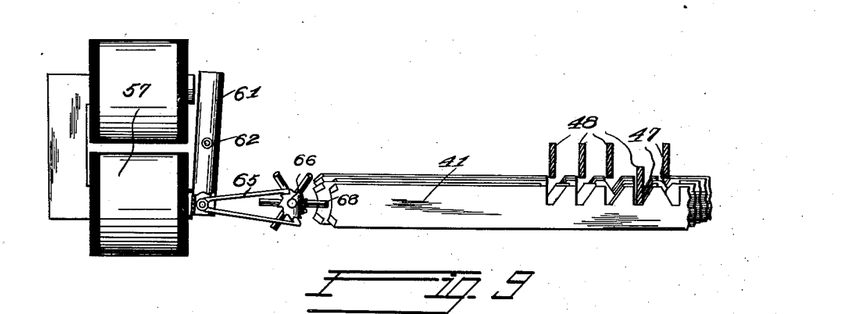
Figure 9 is a front elevation of the transmitter with parts broken away showing the driving means.

Referirng to Figures 8 and 9 one type of transmitter which may be utilized comprises a plurality of transversely movable permutation bars 41 to 46 each having a plurality of cam surfaces 47. A plurality of bars 48 mounted for vertical movement on a framework (not shown) are mounted to co-act with the cam surfaces on bars 41 to 46, so that when the bars 48 are depressed bars 41 to 46 are moved transversely in various combinations in accordance with a predetermined code as is well known in the art. Bar 46 is a universal bar and is moved transversely by the depression of each key or signal bar 48. As bar 46 moves transversely to the left on depression of a key, it engages pawl 49. Pawl 49 is moved forward by bar 46 and actuates bell crank 50 upon which pawl 49 is pivotally mounted at 51. Bell crank 50 is rocked about its pivoted point 52 and closes contacts 53. As pawl 49 is moved to the left its cam surface 54 rides on fixed pin 55 and stresses spring 56. After contacts 53 have been closed the cam action of pin 55 on surface 54 moves pawl 49 about point 51 to release the pawl from actuating engagement with bar 46. In this manner, if a key is held depressed after the selective combination controlled thereby has been sent, contacts 53 will be free to open and a second character will not be sent. When the key is released, pawl 49 and bell crank 50 will be returned to normal position under influence of the contact spring and spring 56. The usual keyboard interlock (not shown) may be provided to guard against release of a depressed key before the combination has been completely transmitted.

Closure of contacts 53 completes an energizing circuit from a locally generated source of alternating current, to coils 57 of a timed alternating current magnet. This magnet is of the construction described in detail in connection with magnet 22 (Figure 1). Armature 61 pivotally mounted at 62 rocks thereabout as the coils 57 of the magnet are energized by the alternating currents. Pivotally mounted on the armature 61 is a forked double acting pawl member 65 in cooperative relation with the teeth of a driving ratchet wheel 66, the rotation of which is obtained in a manner described in detail in connection with Figures 1 and 5.

Mounted in bearings, or supports (not shown) so as to be rotatably and axially movable, is a pin barrel 67. Toothed wheel 66 is rigidly fastened to and rotates pin barrel 67. Mounted on pin barrel 67 in angularly and axially displaced relation to each other is a series of pins 68 to 74. Pin barrel 67 is normally held in retracted axial position by a contact member 75 through the action of spring 76. Line contacts 77 are normally closed with pin barrel 67 in retracted position. In normal resting position of the pin barrel, pin 68 engages a latch member 78 and prevents locking of contacts 53.

When, as above described, contacts 53 have been permitted to close by actuation of bar 46 magnet 57 is energized by the alternating currents and armature 61 commences to vibrate and rotates the pin barrel 67. On the first step pin 68 moves out of engagement with latch member 78 which then locks contacts 53 in closed position. Pin 69 then engages a fixed cam member 79. This causes axial movement of the pin barrel and thereby opens contacts 77 causing a preliminary or start condition on the line. After pin 69 has passed cam 79, pin barrel 67 is axially restored through action of spring 76, and contacts 77 are again closed. The pin barrel continues to rotate and pins 70 to 74 successively pass by cam members 80 to 84 carried by bars 41 to 45. As shown, bars 42, 44 and 45 are actuated and in this condition interpose cams 81, 83 and 84 respectively in the path of pins 71, 73 and 74. As each pin passes a corresponding actuated bar (41—45) the pin barrel will move axially actuating contacts 77 to send code combinations of marking and spacing conditions on the line or other transmitting medium. It will be obvious that the relative times occupied by marking, spacing, start, and stop condition may be varied at will by increasing or decreasing the width of cams 79 to 84 and varying proportions to suit varying line conditions. Block signals or separated interval signals may obviously be sent depending on proportion of the parts. Codes comprising reversals of polarity of impulses may also be transmitted if desired in an obvious manner. After the last impulse of a combination has been sent, contacts 77 remain closed, and the pin barrel rotates under control of the vibrating armature until pin 68 engages latch 78 and opens contacts 53. Even if key bar 48 is held depressed contacts 53 will open the circuit of magnet 57 and rotation of the pin barrel will stop. Thereafter the key must be released to permit re-engagement of bar 46 and pawl 49 before another code combination can be sent.

In Figure 4 a modification of this transmitter is shown in which only the stop mechanism is shown differently. A bell crank 86 pivoted at 87 is normally held in engagement with stop pin 68 on the barrel 67. When a bar 46 operates, bell crank 87 is rocked to disengage stop pin 68 and the shaft is released for rotation.

In Figure 7 a modified form of stop mechanism is disclosed. A pin 91 carried by shaft 92 is normally forced into recess 93 by the armature of a magnet such as 30 (Figure 3) against the tension of helical spring 94 fastened at one end to disk 95 secured on shaft 92 and at its other end to friction clutch 96. Friction clutch 96 mounted on pin barrel shaft 97 frictionally engages ratchet wheel 98. With magnet 30 energized stop pin 91 in recess 93 locks the pin barrel shaft from rotation. When, however, the magnet is de-energized helical spring 94 moves shaft 92 longitudinally and pin 91 leaves recess 93. Shaft 97 is now free to rotate with ratchet wheel 98 driven through friction clutch 96.

Figure 10:
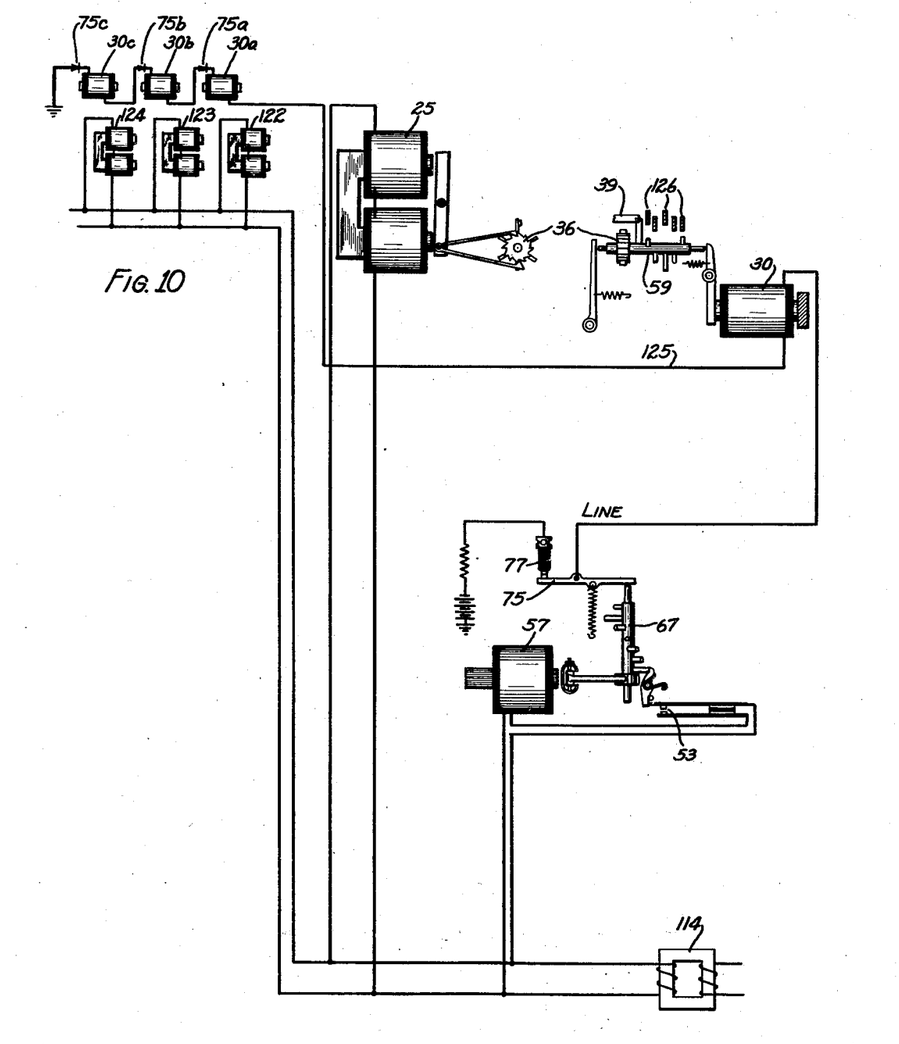
Fig. 10 is a diagrammatical view of a complete circuit system.

Having set forth the several parts that comprise a complete system embodying the present invention, this system will now be described. Referring to Fig. 10 it will be noted that the common source of alternating current indicated at 114 is of the type disclosed in Fig. 3, but it is obvious that the alternating current may readily be derived from a public or commercial source without departing from the spirit of the invention. In Fig. 10 the several magnets 57, 25 and 122 to 124 are indicated as connected in parallel and are adapted to operate synchronously. The receiving magnets 30, 30a, 30b, and 30c, and the transmitting contacts 75, 75a, 75b and 75c are indicated as connected in series over wire 125.

The transmitting contact member 75 is actuated through pin barrel 67 in accordance with the setting of selector bars as described in connection with Fig. 8, to effect through selector magnet 30 and pin barrel 59 associated therewith a corresponding setting of the selectors 126 as disclosed in the previously mentioned Kleinschmidt Patent No. 1,567,599. The contacts 75a, 75b and 75c may be similarly actuated, and the magnets 30a, 30b and 30c similarly affected. Furthermore, it is apparent that each station may include in addition to a transmitting device, a receiving device so as to provide a home record of the transmitted message. Such an arrangement is suggested in Fig. 10.

It will of course be understood that the parts in the figures are shown in schematic form and distorted relation to better illustrate the invention. For the sake of clearness, supports have been omitted and only so much of well known apparatus has been illustrated as is required to clearly show the invention. It will be clear that the invention is not limited to the specific embodiment shown and described herein, but is to be limited only by the following claims.

What is claimed is:

1. In a telegraph transmitter, a rotatable distributor, an electro-magnetic means for operating said distributor, said electro-magnetic means being normally open circuited, a plurality of key levers, permutation bars associated with said key levers for selectively operating said distributor in accordance with the key lever operated and a permutation bar common to all of said key levers and operative in response to the operation of any one of said key levers for closing the circuit of said electro-magnetic means.

2. In a telegraph transmitter, a cam shaft, a contact mechanism controlled by said cam shaft, electro-magnetic means for controlling the rotation of said cam shaft, a contact connected in series with said electro-magnetic means and normally held open by said cam shaft, a plurality of key levers, means responsive to the operation of any one of said key levers for seelctively operating said cam shaft, and means common to all of said key levers and operated in response to the operation of any one of said levers for closing said contacts.

3. In a telegraph transmitter, a cam shaft, a contact mechanism controlled by said cam shaft, electro-magnetic means for controlling the rotation of said cam shaft, a contact connected in series with said electro-magnetic means and normally held open by said cam shaft, a plurality of key levers, means responsive to the operation of any one of said key levers for selectively operating said cam shaft and means common to all of said key levers and operated in response to the operation of any one of said levers for closing said contacts, said cam shaft being operative at the end of a signalling period for opening said contact.

4. In a telegraph system, a cam shaft, a driving electro-magnetic means tending to rotate said cam shaft, a stop device, a receiver mechanism normally maintaining said stop device in position to hold said cam shaft from rotation, and means cooperating with said receiver mechanism when operated in response to a start condition for operating said stop device to release said shaft for rotation under control of said driving electro-magnetic means.

5. In a telegraph system, a cam shaft, a driving means, a clutch mechanism between said driving means and said shaft, a stop pin normally engaging said shaft to prevent rotation thereof, a receiver magnet for maintaining said stop pin in engagement with said shaft, said receiver magnet being responsive to a received impulse for permitting said stop pin to disengage said shaft, and spring means between said shaft and said driving means for urging said pin from engagement with said shaft when said magnet responds to said start condition.

6. In a selective system, a plurality of rotary distributors each arranged to be arrested in motion at the end of each revolution, a common source of alternating current, and electro-responsive means associated with each of said distributors energized by reversals of currents supplied by said source for driving said distributors in fixed time relation with respect to reversals of said current.

7. In a selective system, a transmitting contact, a selector mechanism, a rotary distributor coacting with said selector mechanism for variably operating said contact and an alternating current motor driving said distributor, said motor comprising a normally magnetized core, a plurality of coils carried by said core and an oscillating pawl carrying member controlled by said coils and rotating said distributor.

8. In a selective system, a transmitting contact, a selector mechanism, a rotary distributor coacting with said selector mechanism for variably operating said contact and an alternating current motor driving said distributor, said motor comprising a normally magnetized core, a plurality of coils carried by said core, an oscillating pawl carrying member controlled by said coils and rotating said distributor, a second rotary distributor, and a common source of alternating current for operating said distributors in synchronism.

9. In a selective system, a movable distributor, a code transmitting contact, selector mechanism for selectively operating said distributor to variably operate said contact, a source of alternating current, a tuning fork for variably controlling said source of alternating current, and means responsive to said source for maintaining said distributor in fixed time relation with respect to the operation of said code transmitter.

10. In a selective system, a rotary distributor movable in cycles, a code transmitter for transmitting code combinations of impulses variably operated by said distributor, means for initiating a cycle of movement of said distributor, a source of alternating current, a magnet vibrating in unison with reversals of current generated by said source causing cyclic movement of said distributor in definite timed relation with respect to said transmitter operation, and contact mechanism actuated by said distributor and controlling said source to arrest movement of said distributor at the end of the cycle.

11. In a telegraph system, a plurality of stations, a source of direct current, a tuning fork in operative relation with said source of direct current for generating pulsating current, means for vibrating said tuning fork, means electrically connected to said tuning fork for translating said pulsating direct current produced by the vibration of the tuning fork into an alternating current rotating members at each of said stations remote from said tuning fork and electro magnetic means individual to each of said rotating members operated in accordance with said received alternating current for operating said rotating means in synchronism with each other.

12. In a telegraph system, a plurality of stations, a source of direct current, a tuning fork in operative relation with said source of direct current, means for vibrating said tuning fork, a transformer in operative relation with said tuning fork for generating in its output a current having twice the frequency of said tuning fork, rotating members at each of said stations remote from said tuning fork and electro magnetic means individual to each of said rotating members operated in accordance with said alternating currents for operating said rotating mechanisms in synchronism with each other.

13. In a telegraph system, a plurality of stations, a source of direct current, a tuning fork in operative relation with said source of direct current, means for vibrating said tuning fork to produce pulsating currents, a transformer electrically connected to said tuning fork for translating said pulsating currents into alternating currents, rotating members at each of said stations remote from said tuning fork, electro magnetic means individual to each of said rotating members and electrically connected to said transformer for operation in accordance with said alternating currents for operating said rotating mechanisms in synchronism with one another, each of said electro magnetic means being normally open circuited and means operative at the beginning of a cycle of operation for closing the circuit of the open circuited electro magnetic means.

14. In a telegraph system, a first station, a plurality of remote stations, distributors at each of said stations, a source of direct current, means including said source of direct current for generating an alternating current, electro magnetic means at each of said stations connected in parallel relation with each other and responsive to said alternating current for operating the distributors thereat in synchronism, each of said electro magnetic means being normally in an open circuit and means at each station for closing said electro magnetic means circuit at the beginning of a cycle for rendering said electro magnetic means operative in response to said alternating current.

15. In a telegraph system, a first station, a second station, a plurality of remote stations, distributors at each of said stations, a source of direct current, means including said source of direct current for generating an alternating current, electro magnetic means at each of said stations connected in parallel relation with each other, said electro magnetic means being normally in an open circuit, a cam shaft rotated by said electro magnetic means, a contact mechanism controlled by said cam shaft, said contact being connected in series with said electro magnetic means and normally held open by said cam shaft, a plurality of key levers, means responsive to the operation of any one of said key levers, for selectively operating said cam shaft and means common to all of said key levers and operated in response to the operation of any one of said key levers for closing said contact.

16. In a telegraph system, a first station, a second station, a plurality of remote stations, distributors at each of said stations, a source of direct current, means including said source of direct current for generating an alternating current, electro magnetic means at each of said stations and connected in parallel relation to each other operated in response to said alternating currents for operating the distributors thereat in synchronism, a rotatable distributor rotated by said electro magnetic means, said electro magnetic means being normally open circuited, a plurality of key levers, permutation bars associated with said key levers for selectively operating said distributors in accordance with code combinations to be transmitted and operative in response to the operation of any one of said key levers for closing the circuit of said electric magnetic means.

17. In a telegraph device, a cam shaft, a driving electro magnetic means for rotating said cam shaft, a stop device, a receiving mechanism, means for normally maintaining said stop device in position to hold said cam shaft from rotation, means cooperating with said receiver mechanism and operating in response to a selecting condition for operating said stop device to release said shaft for rotation under control of said driving electro magnetic means, a source of direct current, a tuning fork, means in operative relation with said tuning fork for generating an alternating current, said driving electro magnetic means being responsive to said current.

18. In a telegraph device, a cam shaft, an electro magnetic driving means, a clutch mechanism between said driving means and said shaft, a stop pin normally engaging said shaft for normally preventing rotation thereof, a receiver magnet for maintaining said stop pin in engagement with said shaft, said receiver magnet being responsive to a received impulse for permitting said stop pin to disengage said shaft, spring means between said shaft and said driving means for releasing said pin from engagement with said shaft when said magnet responds to said impulse, a tuning fork, means for operating said tuning fork at a predetermined frequency, a source of direct current in operative relation with said tuning fork, means electrically connected to said source and said tuning fork for translating the pulsations produced by said tuning fork and said source into an alternating current of a frequency twice the frequency of said tuning fork, said electro magnetic means being responsive to a double frequency for operating said electro magnetic driving means.

19. In a selector system, a plurality of rotary distributors, each arranged to be arrested from rotation at the end of each revolution thereof, a source of direct current, means for producing pulsating current from said direct current, means for translating said pulsating current into alternating currents and electric responsive means associated with each of said distributors energized by said alternating currents for driving said distributors in fixed time relation with respect to said reversal.

20. In a selective signalling system, a transmitting apparatus adapted to transmit selective combinations of electrical impulses, said transmitting apparatus embodying a rotary distributor started into rotation to transmit said impulses and arrested in rotation at the end of each revolution after a selective combination has been transmitted; and a source of alternating current local to said transmitting apparatus constituting the sole agency for timing speed of rotation of said distributor.

21. In a selective signalling system, a plurality of key members, a plurality of cam surfaces movable in various combinations under control of said key members, a fixed cam surface, and a rotary member co-acting with said cam surfaces to transmit selective combinations of electrical impulses.

22. In a selective signalling system, a plurality of cam members movable in various combinations, means selectively controlling said cam members, a fixed cam member, a rotary member caused to be moved axially by said fixed cam member and selected movable cam members; and contact mechanism controlled by axial movement of said rotary member.

23. In a selective system, permutation means, means selectively controlling said permutation means, a movable member; a contact mechanism, a controlling member for said contact mechanism engaged by said member, and means for releasing said controlling member from actuating engagement with said member while said member is in motion.

24. In a selective system, a plurality of movable permutation bars, a bar, means for selectively actuating said permutation bars in various combinations, a contact mechanism, a pawl adapted to be engaged by said bar and controlling said contact mechanism; a cam surface on said pawl adapted to disengage said pawl from actuating engagement with said bar before said bar is restored to unactuated position.

25. In a telegraph system, a source of direct current, a tuning fork in operative relation with said source of direct current; means for vibrating said tuning form; a transformer in operative relation with said tuning fork generating in its output windings a current of a predetermined frequency; transmitting apparatus for transmitting code combinations of impulse conditions, a distributor for said transmitting apparatus; and means whereby the alternating currents of predetermined frequency operate said distributor in predetermined timed relation.

26. In a telegraph system, a source of direct current; a tuning fork in operative relation with said source of direct current; means for vibrating said tuning fork; a transformer in operative relation with said tuning fork generating in its output windings a current of predetermined frequency; transmitting apparatus for transmitting code combinations of impulse conditions; a distributor for said transmitting apparatus; means whereby the alternating currents of predetermined frequency operate said distributor in a predetermined timed relation; and means for periodically starting and stopping said distributor.

27. In a telegraph system, a source of direct current; a tuning fork in operative relation with said source of direct current; means for vibrating said tuning fork; a transformer in operative relation with said tuning fork generating in its output windings a current of a predetermined frequency; transmitting apparatus for transmitting code combinations of impulse conditions; a distributor for said transmitting apparatus; means whereby said currents of predetermined frequency operate said distributor in a predetermined timed relation; and means for arresting the rotation of said distributor at the end of each revolution after a code combination of impulse conditions has been transmitted thereby.

28. In a telegraph system, a plurality of stations; a source of direct current; means comprising said source of direct current for generating an alternating current including a tuning fork and transformer; a rotary and axially movable distributor; means controlled by said source of alternating current for operating said distributor in a predetermined timed relation; and contact mechanism controlled by said combined rotary and axial movement of said distributor for transmitting code combinations of impulse conditions.

29. In a telegraph system, a source of direct current; means comprising said source of direct current for generating an alternating current including a tuning fork and a transformer; a plurality of key members, a plurality of cam surfaces movable in various combinations under control of said key members; a fixed cam surface; a rotary member coacting with said cam surface to transmit selective combination of impulse conditions; and means controlled by said source of alternating current for controlling said distributor in a predetermined time relation.

In testimony whereof I affix my signature.

EDWARD E. KLEINSCHMIDT.